Feb. 8, 1955  G. E. SHERMAN  2,701,657
LOAD-MOVING APPARATUS
Filed June 14, 1951  4 Sheets-Sheet 3
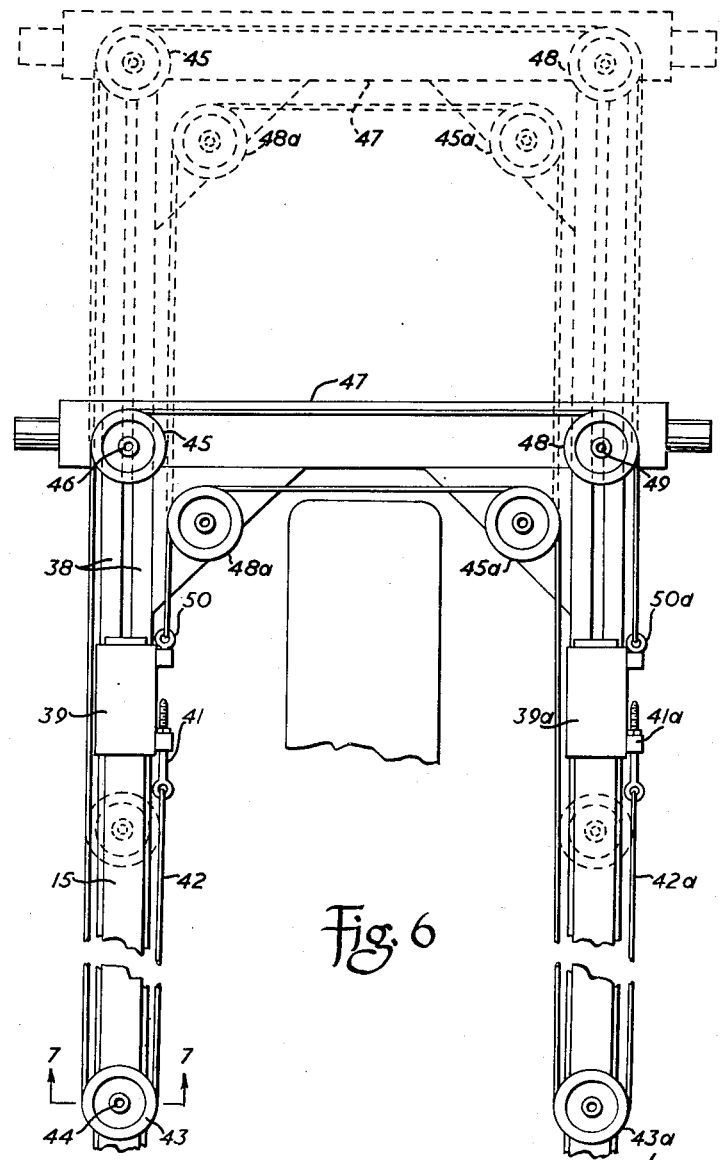

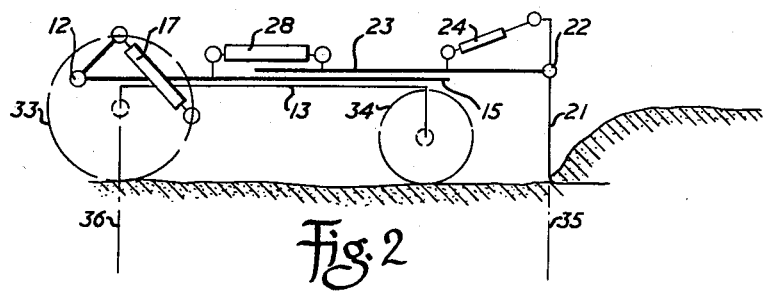
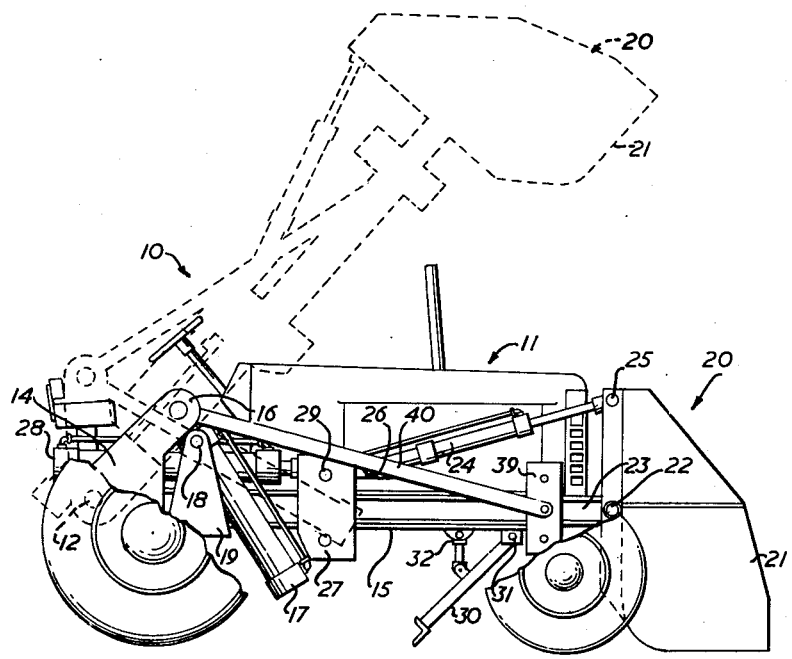

Feb. 8, 1955 G. E. SHERMAN 2,701,657
LOAD-MOVING APPARATUS
Filed June 14, 1951 4 Sheets-Sheet 4
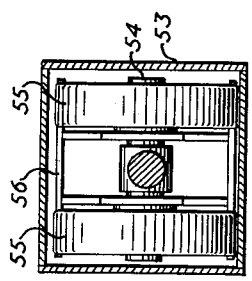
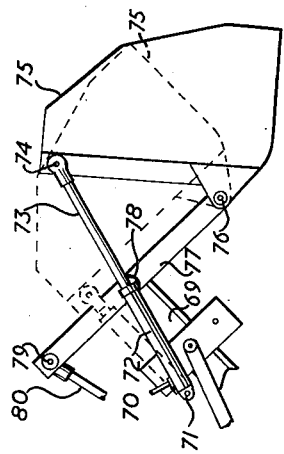
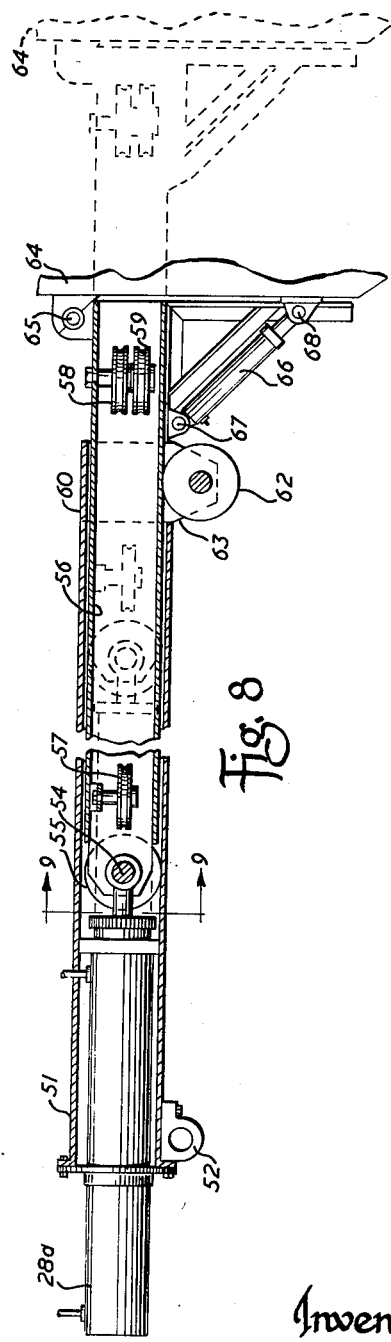
Inventor
GEORGE E. SHERMAN
by: Fetherstonhaugh & Co.
Attys.

United States Patent Office 2,701,657
Patented Feb. 8, 1955

2,701,657

LOAD-MOVING APPARATUS

George E. Sherman, Chatham, Ontario, Canada

Application June 14, 1951, Serial No. 231,534

2 Claims. (Cl. 214—141)

This invention relates to a loader mechanism mountable on a track or rubber-tired vehicle of that class ordinarily employed in load-moving operations.

The effort which a so-called bulldozer or load-moving vehicle may apply to the earth or other object to be moved is determined by the tractive effort of the vehicle which is a function of motor horsepower, weight of the vehicle, and tractive friction. The vehicle reaches its maximum tractive effort having regard to its weight and the load being moved just before the wheels or tracks being to slip. Thus, all prior load-moving equipment is limited in this way.

I have observed that it is much more efficient to move a load by placing a prime mover between the load and a fixed anchorage. Although this is well known, such a principle has not heretofore been applied to load-moving equipment in the form of a readily usable mechanism which may enhance the load-moving capacity of an earth-moving or loading vehicle. Such a proposal is inherent in the present invention wherein the main object is: to provide mechanism fastenable to a vehicle designed to engage and move a load relative to the vehicle.

Another object of the invention is to provide a mechanism according to the aforesaid principle and which is readily adaptable to present mechanical systems of load-moving equipment of either the wheeled or tracked class.

A further object of the invention is to provide mechanism or apparatus mountable on conventional load-moving vehicle frames or the like and usable in combination therewith to move a load relative to the vehicle while the vehicle remains in a fixed position and whereby the vehicle may overcome the resulting distance extending between the load-moving member of the vehicle and then accomplish a lifting of the load on the load-moving member to a desired position.

A still further object of the invention is to provide means for equalizing the extension of the slidable arms of a load-moving member in combination with means for projecting the load-moving member relative to the vehicle.

With these and other objects in view, the invention generally comprises, load-moving apparatus fastenable to a vehicle in the form of a load-moving member, a pair of slidable arms supporting said member and slidable relative to the vehicle, means for moving the slidable arms and the load-moving member relative to the vehicle. Preferably, I also provide means for swinging the slidable arms in such manner as to raise the load-moving member above the vehicle. Other objects of the invention will be appreciated by a study of the following specification taken in conjunction with the accompanying drawings.

In the drawings:

In Figure 1, one form of tractor suitable for carrying the apparatus of the invention is shown having my load-moving apparatus mounted thereon and illustrating a vertical disposition of such apparatus in chain lines.

Figures 2 to 5 inclusive are schematic diagrams of the function of load-moving apparatus of my invention and the use of such when mounted on a suitable vehicle and illustrating load-moving and vehicle recovery consecutive movements.

Figure 6 is a plan view of my improved sliding arm support structure for a load-moving member.

Figure 7 is a sectional view 7—7 of Figure 6.

Figure 8 is a sectional elevation of a modified form of the sliding arms of Figure 6.

Figure 9 is a sectional view 9—9 of Figure 8.

Figure 10 is a view of a modified form of load-moving member in the form of a bucket and double-acting pivotal actuating means for front or rear end loading operations.

Figure 3:
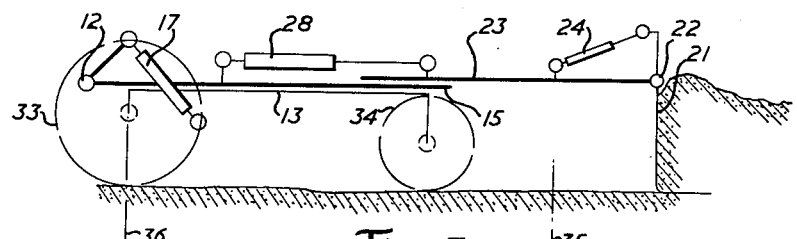

Referring in more detail to the drawings, the load-moving apparatus 10 of the invention may be applied as illustrated in Figure 1 to a suitable vehicle such as a wheeled tractor 11. A main pivot 12 operatively connected to the frame 13 (not shown in this figure) of the tractor at the rear end, supports an arm 14 on each side of the tractor which is fixed to the support 15. The free end 16 of the bell crank arm 14 is pivotally connected to one end of a hydraulic cylinder 17, the latter being pivoted as at 18 on a fixed bracket 19 extending upwardly from the frame 13. When the hydraulic cylinder 17 is actuated, the support 15 pivots about the main pivot 12 to the position of the components illustrated in chain lines in Figure 1. This part of the apparatus is substantially conventional and may be of any of the various known forms, it being realized that there is a support 15 on each side of the tractor body 11.

According to the invention, a load-moving member 20 in the form of an earth-scooping bucket 21 illustrated is pivoted as at 22 by a suitable axle or pin to a pair of parallel spaced apart slidable arms 23 disposed for slidable relation with the supports 15. The angular disposition of the load-moving member 20 with respect to the slidable arms is preferably adjustably controlled by means of a hydraulic cylinder 24 having its connecting rod pivotally connected as at 25 to a point on the bucket 21 spaced from the pivotal connection 22, the other end of the cylinder 24 being pivotally connected as at 26 to an enlarged bracket 27 fixed to the slidable arm 23. Enlarged brackets slidably rise along the support arm 15 by means of suitable rollers engaging the upper and lower faces of the latter (not shown). It will be realized that there are a pair of cylinders 24 acting in this manner on each side of the tractor.

Slidable movement of the slidable arms 23 is accomplished by a hydraulic cylinder 28 having one end fixed to the support arm 15, the other end of which pivotally connects to the slidable bracket 27 as at 29. In this way, each of the slidable arms has its own cylinder 28 to accomplish its slidable movement relative to the vehicle or tractor 11. The hydraulic connections of the hydraulic cylinders are substantially conventional and need no explanation aside from my preference that for the pair of cylinders 28 such should be driven by an independent pressure system wherein such cylinders are connected hydraulically in parallel. The other pairs of cylinders are connected preferably in a similar manner.

I may also provide an anchorage leg 30 pivotally mounted as at 31 on the frame of the tractor, the leg being actuable by an hydraulic cylinder 32. It will be realized that all of the hydraulic cylinders illustrated are of the double-acting type in the specific apparatus disclosed for purposes of discussion.

In operation, the apparatus of the invention affords features not heretofore capable of accomplishment in earth-moving equipment in particular. Thus, referring to Figures 2 to 5, the functional operation of a vehicle having apparatus of the invention thereon is illustrated, wherein the vehicle is represented by the line 13 representing the frame, having wheels 33 and 34 thereon. The apparatus of the invention is shown in bold lines and in Figure 2 it will be evident that the slidable arms 23 are disposed in the retracted position with respect to the supports 15 whereby the shovel 21 may be used as a conventional shovel mechanism on the front end loader of the usual earth-moving equipment. In Figure 2, the vehicle is shown in a position with the slidable arms retracted and the shovel engaged in the earth load after maximum tractive effort of the wheels 33 and 34.

In Figure 3, a particular feature of the invention is illustrated wherein the pushing cylinder 28 is actuated to cause relative movement between the load-moving member or bucket 21 and the vehicle. The starting line 35 of the shovel is indicated to illustrate this relative movement.

Figure 4:
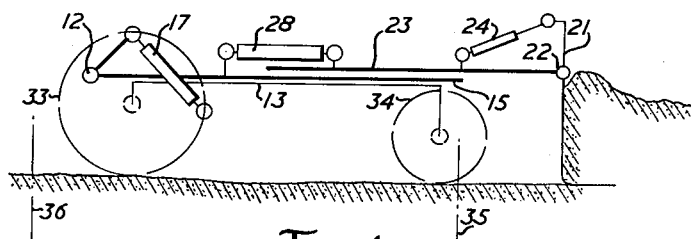
Figure 5:
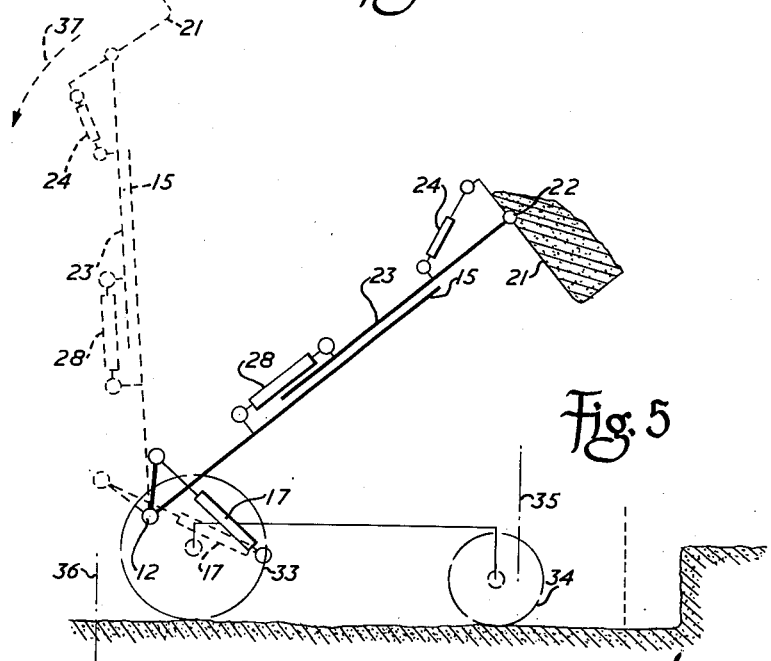

In the movement illustrated in Figure 4, it is desired to prepare the load for lifting. In this operation, the vehicle is merely driven forward to recover the initial closed relative positions of the load-moving member and the vehicle, the advance of the vehicle from its initial line 36 being evident in this illustration. The load in the shovel 21 is now ready for lifting since it is on the shortest moment arm with respect to the main pivot 12. The load is then lifted in the conventional manner under action of the lifting cylinder 17. The pivoting of the shovel or bucket as at 22 is particularly advantageous since under action of the tipping cylinder 24 the supports and slidable arms may be swung to the position illustrated in chain lines in Figure 5 and the bucket tipped as illustrated, to cause the load to fall rearwardly in the direction of the chained arrow 37. All of the apparatus is returned to the original position illustrated in Figure 1 in a manner clearly evident to skilled persons and merely by release of sustaining pressure in the cylinder 17.

In the apparatus of my invention, I prefer to provide means for equalizing the extension of the slidable arms regardless of the force opposing their movement. One form of suitable construction is illustrated in Figures 6 and 7 wherein the supporting arm 15 is in the form of a wide flanged steel I-section slidably carrying a pair of members 38 which constitute the sliding arm 23 and which at one end carry the bracket 38a. Referring also to Figure 1, it will be observed that a fixed bracket 39 is disposed on the free end of each support member 15 and fixed thereto and is connected by the members 40 to the free end 16 of the bracket arm 14. In Figure 6, this end support serves to mount an adjustable bracket 41 to which flexible steel cable 42 is fixed, the latter extending about a pulley 43 pivoted as at 44 on the support 38a. The cable then extends about the pulley 45 pivoted as at 46 on the framepiece 47 supporting a bucket or other load-moving member (not shown) and thence over a similar pulley 48 pivoted as at 49 to an anchorage 50a on the other corresponding end support 39a. A second and similar cable 42a extends from a similar bracket 41a over similar pulleys 43a, 45a and 48a to the fixed anchorage 50.

Under actuation of the slidable arms relative to the supports, the two cables measure out the equal displacements for both arms and equalize the force therebetween so that the frame 47 maintains its desired right-angular relationship with the slidable arms 23. The cables 42 and 42a effectively provide a continuous cable in that the anchorages 39 and 39a operatively constitute a portion thereof.

In Figures 8 and 9, I illustrate a modified construction of support arm and slidable arm mechanism, wherein the support arm 51 has a pivot bracket 52 for the main pivot pin and is in the form of a box girder construction 53 illustrated in Figure 9. In this case, the main pusher cylinder 28a is mounted within the support member 51 and has its actuating end connected by a pivot pin 54 which also carries a pair of rollers 55. The pin 54 also serves to connect to the inner end of the telescoping sliding arm 56, the latter carrying the pulleys 57, 58 and 59 designed to act in the same manner as the pulleys illustrated in Figure 6. It will be observed that free end 60 of the support arm 51 carries a supporting roller 62 on a framepiece 63 to assist the slidable action of the slidable arm 56 therewithin. Also in this modified form a bucket device 64 or the like may be pivoted as at 65 to the slidable arm 56. The bucket tipping cylinder 66 acts between the pivot point 67 on the slidable arm and the pivot supporting bracket 68 on the bucket 64.

In Figure 10, a modified form of bucket tipping apparatus is illustrated which is particularly adapted for use on a front end loader type of equipment. In this case, the bucket end of a bucket supporting arm 69 has a bucket tipping cylinder bracket 70 fixed thereon and pivotally carrying as at 71 the bucket tipping cylinder 72 acting through its arm 73 by pivotal connection as at 74 to tip the bucket 75 about the pivotal point 76 of the framepiece 77. It will be observed that the framepiece 77 in this modification may also be pivoted as at 78 to the bucket supporting arm 69 and, therefore, the framepiece 77 may also carry a pivotal connection 79 at its other or opposed end capable of actuation by the piston arm 80 of a secondary bucket tipping cylinder. In this way a two-way action may be afforded adaptable for both front and rear end loading.

It is intended that the present disclosure should not be construed in any limiting sense other than that indicated by the scope of the following claims.

What I claim as my invention is:

1. A load-moving attachment for a vehicle and comprising: a pair of support arms each adapted to be pivotally mounted at one end thereof on the vehicle; a slidable arm slidably mounted on each support arm; a frame member rigidly extending between the free ends of the slidable arms; an effectively continuous cable having two end loop portions and an intermediate portion; pulleys on each slidable arm supporting one end loop portion of said cable along the slidable arm; said intermediate portion of said cable extending between said arms and two of the pulleys of each arm; and means anchoring a portion of each end loop portion of said cable to the support arm carrying the slidable arm along which the said end loop extends.

2. A load moving attachment as claimed in claim 1 in which said effectively continuous cable is formed of two cables defining the intermediate portion thereof and extending to form a part of each loop to terminate at the anchorage means for said loops.

References Cited in the file of this patent
UNITED STATES PATENTS

| 1,504,427 | Butler | Aug. 12, 1924 |
| 1,768,316 | Grahek | June 24, 1930 |
| 1,930,694 | Sloane | Oct. 17, 1933 |
| 1,937,016 | Gibby | Nov. 28, 1933 |
| 2,413,096 | Barker | Dec. 24, 1946 |
| 2,472,223 | McElhinney et al. | June 7, 1949 |
| 2,631,744 | Smith | Mar. 17, 1953 |